(12) United States Patent
Sreerama et al.

(10) Patent No.: US 7,761,057 B2
(45) Date of Patent: Jul. 20, 2010

(54) MANAGING SYSTEM CLOCKS TO REDUCE RFI

(75) Inventors: Chaitanya Sreerama, Hillsboro, OR (US); Michael E. Deisher, Hillsboro, OR (US); Keith R. Tinsley, Beaverton, OR (US); Harry G. Skinner, Portland, OR (US); Stephen H. Hall, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 11/537,635

(22) Filed: Sep. 30, 2006

(65) Prior Publication Data

US 2008/0081586 A1    Apr. 3, 2008

(51) Int. Cl.
*H04B 1/00* (2006.01)
*H04B 1/04* (2006.01)

(52) U.S. Cl. ............... 455/63.1; 455/114.2; 455/296

(58) Field of Classification Search ............ 455/63.1, 455/114.2, 278.1, 296, 67.13, 310; 375/278, 375/285, 296
See application file for complete search history.

(56) References Cited

U.S. PATENT DOCUMENTS

| 5,706,256 | A | 1/1998 | Hood, Jr. et al. |
| 5,745,848 | A | 4/1998 | Robin |
| 6,393,078 | B1 | 5/2002 | Sattler |
| 2002/0094034 | A1 | 7/2002 | Moriyama |
| 2003/0198307 | A1 | 10/2003 | Neill et al. |
| 2008/0137786 | A1 | 6/2008 | Waltho |
| 2008/0137787 | A1 | 6/2008 | Soffer |
| 2008/0240313 | A1* | 10/2008 | Deisher et al. .......... 375/346 |
| 2008/0265968 | A1* | 10/2008 | Furuichi .............. 327/299 |
| 2009/0080498 | A1* | 3/2009 | Deisher et al. .......... 375/136 |
| 2009/0080583 | A1* | 3/2009 | Skinner et al. .......... 375/371 |
| 2009/0138745 | A1* | 5/2009 | Dorsey et al. .......... 713/501 |

OTHER PUBLICATIONS

Non-Final Office Action received for U.S. Appl. No. 11/694,171, mailed on Dec. 28, 2009, pp. 12.

Giridhar, Arvind and P.R. Kumar. "Distributed Clock Synchronization over Wireless Networks: Algorithms and Analysis", Published in: Decision and Control, 2006 45th IEEE Conference on Publication Date: Dec. 13-15, 2006.

Nehorai, et al., "Adaptive Comb Filtering for Harmonic Signal Enhancement", Acoustics, Speech and Signal Processing, IEEE Translation on, Issue 5, (Oct. 1986), pp. 1124-1138.

(Continued)

*Primary Examiner*—Sonny Trinh
(74) *Attorney, Agent, or Firm*—Grossman, Tucker, Perreault & Pfleger, PLLC

(57) ABSTRACT

A method according to one embodiment identifying the frequency range of at least one active channel of at least one wireless communication RF band; identifying the frequency range of at least one clock harmonic; identifying an overlap, in whole or in part, between the frequency range of the at least one active channel and the frequency range of the at least one clock harmonic; and shifting a fundamental frequency of the at least one clock to shift the frequency range of the at least one clock harmonic out of, at least in part, the frequency range of the at least one active channel. Of course, many alternatives, variations, and modifications are possible without departing from this embodiment.

23 Claims, 13 Drawing Sheets

OTHER PUBLICATIONS

"Agilent 89600 series Vector Signal Analysis Software WiMAX (IEEE Std 802.16-2004)", Agilent Technologies, Demonstration Guide and Application Note, IEEE WiMax Committee , 2004, 27 pages.

Wang, "Radio Frequency Effects on the Clock Networks of Digital Circuits" International Symposium on Electromagnetic Compatibility, 2004. Publication Date: Aug. 9-13, 2004, vol. 1, on pp. 93- 96.

"High Rate Ultra Wideband PHY and MAC Standard"; Standard ECMA-368 Third Edition, Published Dec. 2008; 344 pages.

IEEE Standard 802.16-2004; "Part 16: Air Interface for Fixed Broadband Wireless Access Systems"; published Oct. 1, 2004; 895 pages.

"Part 11: Wireless LAN Medium Access Control (MAC) and Physical Layer (PHY) Specifications" LAN/MAN Standards Committee of the IEEE Computer Society; 1999; 528 pages.

"Part 15.1: Wireless Medium Access Control (MAC) and Physical Layer (PHY) specifications for wireless personal area networks (WPANs)" LAN/MAN Standards Committee of the IEEE Computer Society; Jun. 14, 2005; 234 pages.

Notice of Allowance received for U.S. Appl. No. 11/694,171, mailed May 25, 2010, 11 Pages.

* cited by examiner

110

| Clock (602) | RF Channel (604) | Optimal Frequency (606) |
|---|---|---|
| 1 | 1 | xxx MHz |
| 2 | 1 | yyy MHz |
| 3 | 1 | zzz MHz |
| ⋮ | ⋮ | ⋮ |
| 1 | 2 | xxx MHz |
| 2 | 2 | xxx MHz |
| ⋮ | ⋮ | ⋮ |
| p | m | xxx MHz |

MANAGING SYSTEM CLOCKS TO REDUCE RFI

The present disclosure is related to copending U.S. patent application Ser. No. 11,694,171, filed on Mar. 30, 2007, and entitled CLOSED LOOP ADAPTIVE CLOCK RFI MITIGATION.

FIELD

The present disclosure relates to managing system clocks to reduce radio frequency interference (RFI), and more particularly, the present disclosure relates to adjusting system clock frequencies to reduce or eliminate RFI.

BACKGROUND

Wireless platforms may communicate using one or more wireless communication channels. Platform components typically include clocks that, during operation, may generate harmonics that overlap with the frequency range of at least one wireless channel. In some platforms, the close proximity of the clocks and wireless transceivers may introduce significant radio frequency interference (RFI) with one ore more wireless channels. The effect of the RFI may be to significantly reduce the bandwidth and/or operating range of the wireless channel.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 6 depicts one exemplary look-up table according to one embodiment;

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
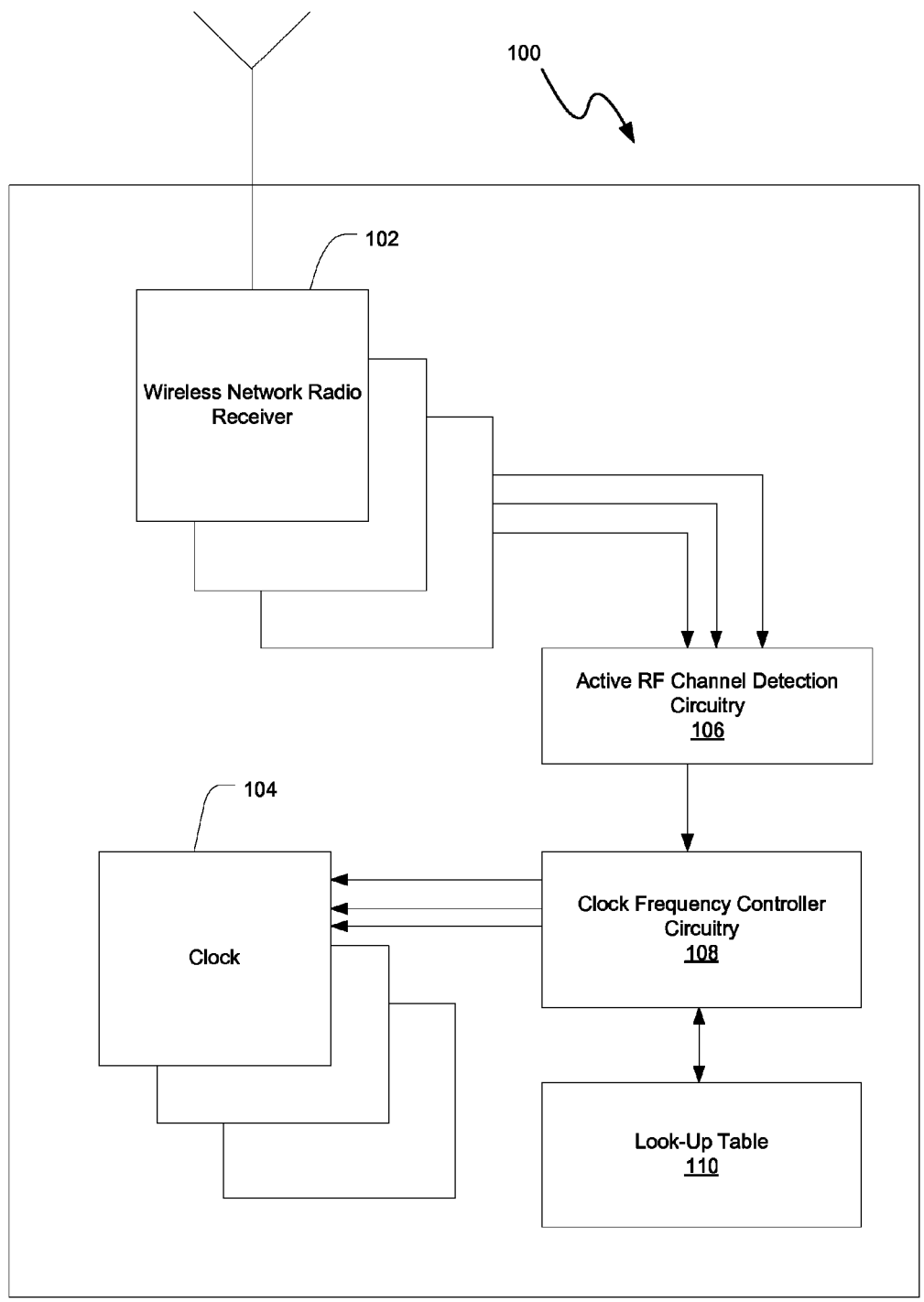
FIG. 1 is a block diagram of a system consistent with one embodiment of the present disclosure.

Referring to FIG. 1, consistent with the present disclosure, a wireless system 100 may include a wireless platform, for example, a laptop computer, Palm® computer, Treo® handheld computer, cell phone, global positioning system (GPS), etc. Wireless system 100 may include at least one wireless network radio receiver 102 and at least one clock 104. The at least one wireless network radio receiver 104 may be configured for wireless communication using, for example 802.11a/b/g, BlueTooth, UWB, WiMax, and/or other wireless communication protocols. Each of these communication protocols may operate over a designated RF band (frequency range) and each RF band may include one or more possible active channels within the RF band. Accordingly, each wireless communication receiver 102 may be configured to receive at least one RF channel within at least one RF band. Clock 104 may include any system or sub-system clock, which may include, for example, CPU clock, memory clock, display clock, bus clock, and/or other system or subsystem clock etc. Thus, the term "clock" as used herein is intended to broadly cover any clock and/or strobe (for example bus strobe) associated with system 100.

The wireless system 100 may also include active radio frequency (RF) channel detection circuitry 106, clock frequency controller circuitry 108 and a look-up table (LUT) 110. Active channel detection circuitry 106 may be configured to detect one or more active RF channels associated with one or more wireless network radio receivers 102. The LUT 110 may correlate clock identity information, active channel information and optimal clock frequency. As will be described in greater detail below, to reduce or eliminate RFI (noise) stemming from the harmonic content of at least one clock 104, clock frequency controller 108 may be configured to adjust the frequency of at least one clock 104 based on, for example, the current active channel information and the clock identity.

Figure 2A:
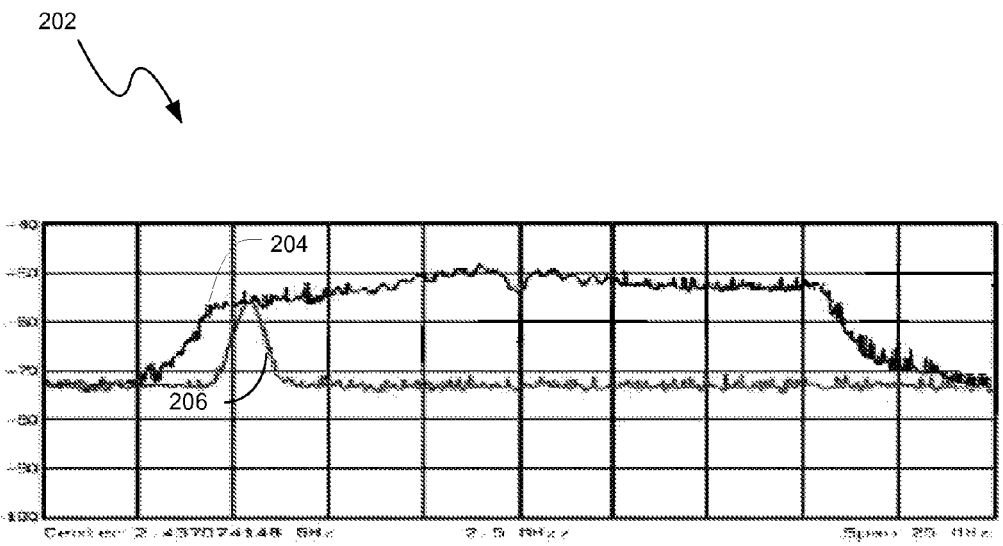
FIGS. 2A and 2B each depict signal graphs of a general overview of the present disclosure.
Figure 2B:
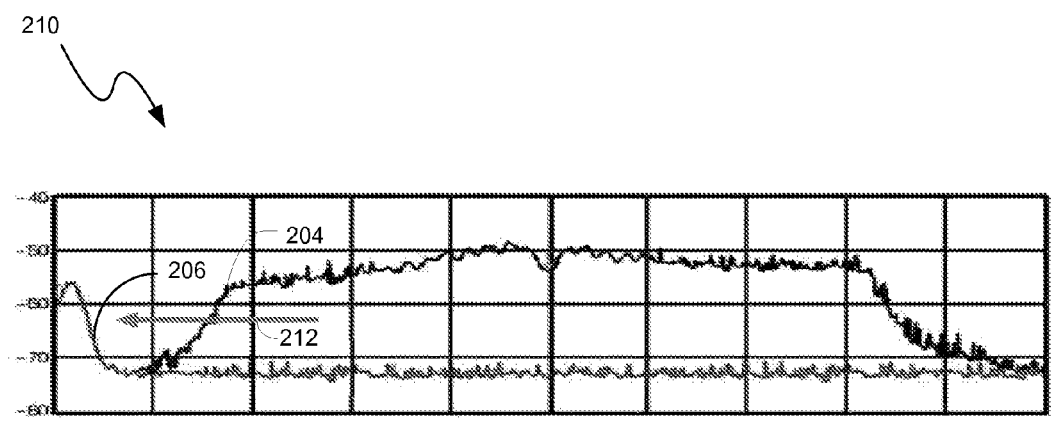

FIGS. 2A and 2B each depict signal graphs of a general overview of the present disclosure. The graph 202 of FIG. 2A depicts an active channel 204 and one clock harmonic 206. The harmonic 206 falls within the frequency range of the active channel 206, and as such, may cause interference leading to reduced bandwidth and/or range for the active channel 204. In other words, the harmonic 206 represents noise within the active channel that may degrade radio performance for the active channel. Operations according to at least one embodiment described herein may shift one or more interfering clock harmonics out of a given active channel. For example, the graph 210 of FIG. 2B depicts the clock harmonic 206 shifted out of the active channel 204, as indicated by arrow 212. The harmonic content of a given clock may be frequency shifted by adjusting the fundamental frequency of the given clock.

Figure 2C:
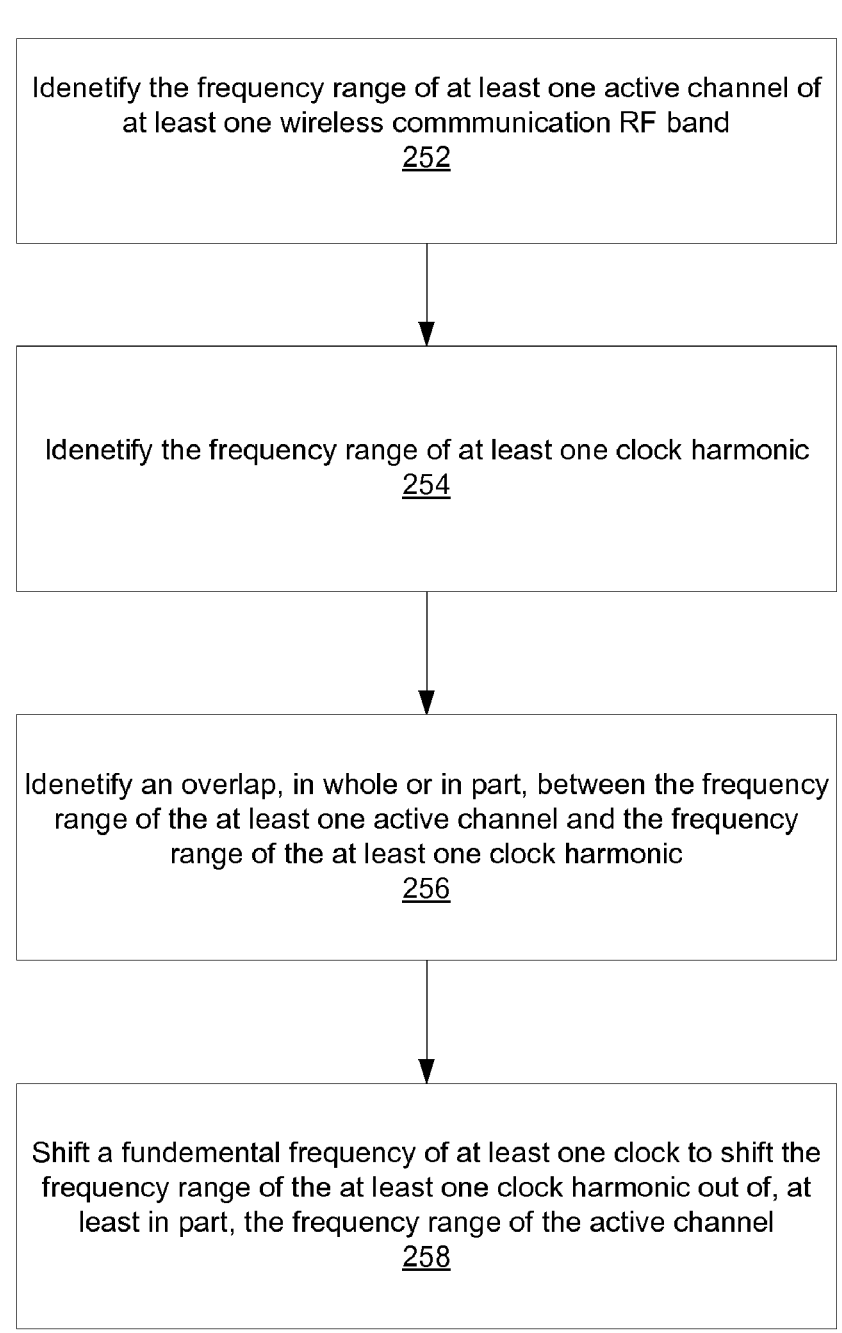
FIG. 2C is a flowchart of exemplary operations according to at least one embodiment.

FIG. 2C is a flowchart 250 of exemplary operations according to at least one embodiment. Operations according to this embodiment may include identifying the frequency range of at least one active channel of at least one wireless communication RF band 252. Operations may further include identifying the frequency range of at least one clock harmonic 254. Operations may also include identifying an overlap, in whole or in part, between the frequency range of the at least one active channel and the frequency range of the at least one clock harmonic 256. Operations may also include shifting a fundamental frequency of the at least one clock to shift the frequency range of the at least one clock harmonic out of, at least in part, the frequency range of the active channel 258.

Figure 3A:
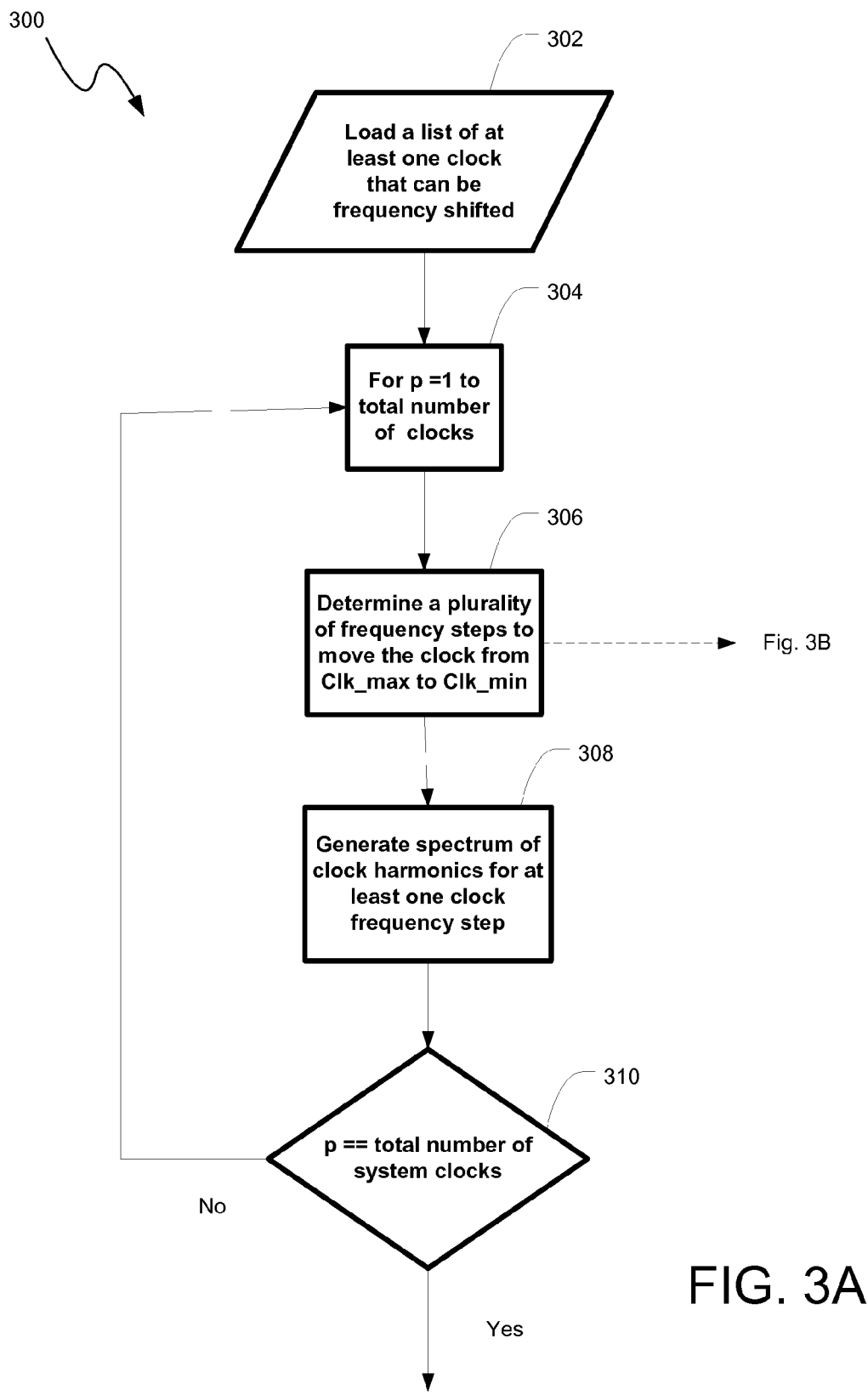
FIG. 3A illustrates a flowchart of exemplary operations to generate the harmonic content of at least one clock.

FIG. 3A illustrates a flowchart 300 of one exemplary method to identify the frequency range of at least one clock harmonic of at least one clock. The method of this embodiment may include loading a list of at least one clock can be frequency shifted 302. Assuming that a plurality of clocks (p) are identified as being able to be frequency shifted, the method of this embodiment may be repeated for all such clocks, for p=1 to the total number of clocks (p) 304. As will be understood by those skilled in the art, a typical clock may include phase lock loop (PLL) circuitry that can adjust the frequency of a clock within a given range, e.g., Clk_max (the nominal or maximum clock frequency) to Clk_min (the minimal allowable frequency for the clock). The method of this embodiment may also include determining the total number of frequency steps to move the clock from Clk_max to Clk_min 306. The number of frequency steps within the range of Clk_max to Clk_min may be a discrete number of steps and may be based on, for example, the minimum PLL frequency increments/decrements and/or a predetermined (e.g., programmable) step size. The method of this embodiment may also include generating a spectrum of clock harmonics for at least one frequency step 308.

The spectrum of n clock harmonics for p clocks may be expressed by, for example, using Equation 1A below:

$$\left[\sum_{n=1}^{N_p} A_{p,n} \gamma\left(\frac{n\omega_{0,p} - \omega}{n\omega_{bw,p}}\right)\right]; \qquad \text{EQ. 1A}$$

where $A_{p,n}$ is the amplitude of the $n^{th}$ harmonic of the $p^{th}$ clock, $N_p$ is the total number of clocks, and $\omega_{0,p}$ is the fundamental frequency of the $p^{th}$ clock, $\omega_{bw,p}$ is the bandwidth of the $p^{th}$ clock, $\gamma$ is a real-valued function defined over a narrow frequency range. EQ. 1A may be evaluated over the independent variable $\omega$(frequency).

Figure 3B:
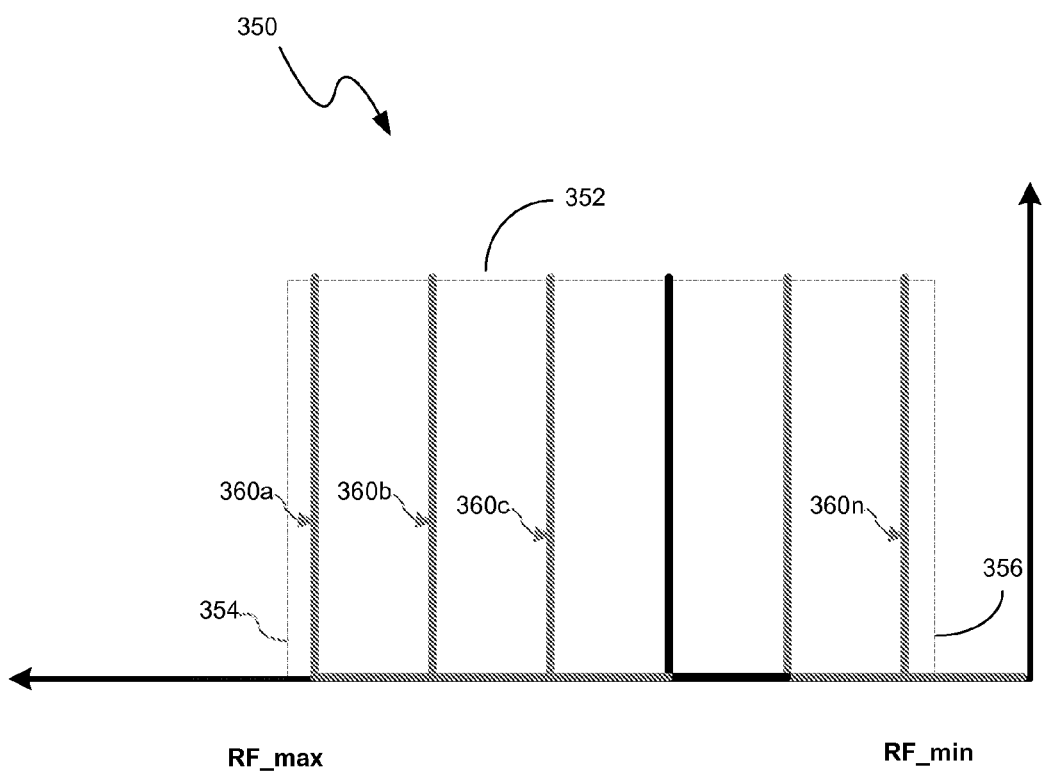
FIG. 3B depicts one exemplary spectral graph of harmonic content of a plurality of frequency steps of a clock.

FIG. 3B depicts one exemplary spectral graph 350 of harmonic content of a plurality of frequency steps of a clock. The graph 350 depicts a plurality of harmonic signals 360a, 360b, 360c, . . . , 360n. In this example, the amplitude of the harmonics are normalized to have the same or approximately the same amplitude. However, in other embodiments, instead of normalizing the amplitudes of each harmonic, the harmonic content may be represented by actual or approximate amplitude values for each harmonic (e.g., non-normalized). The graph 350 depicts harmonic content within the envelope 352 of one RF band, i.e., between a frequency RF_max 354 and RF_min 356 of a given RF band. Of course, it should be recognized that the harmonic content may be distributed outside of the RF band 352 depicted in this figure. Referring again to the method of FIG. 3A, the harmonic content for at least one frequency step for at least one clock may be determined. In a system with multiple clocks, the method of FIG. 3A may be repeated for the total number of system clocks (p) 310.

In other embodiment, one or more of the clocks 104 may operate in variable frequency mode. For example, one or more clocks 104 may comprise a spread clock in which the fundamental frequency of the clock is varied by some percentage. This may cause the harmonics to vary, e.g., become spread. For example, a spread clock may be spread by 1% at the fundamental frequency. In this case, the $100^{th}$ harmonic may be 100 times broader than the fundamental frequency.

The spectrum of n clock harmonics for p spread clocks may be expressed by, for example, using Equation 1B below:

$$\left[\sum_{n=1}^{N_p} A_{p,n} \Gamma_p\left(\frac{n\omega_{0,p} - \omega}{n\omega_{bw,p}}\right)\right]; \qquad \text{EQ. 1B}$$

where $A_{p,n}$ is the amplitude of the $n^{th}$ harmonic of the $p^{th}$ clock, $N_p$ is the total number of clocks, $\omega_{0,p}$ is the fundamental frequency of the $p^{th}$ clock, $\omega_{bw,p}$ is the bandwidth of the spread of the $p^{th}$ clock, and $\Gamma_p$ defines the spreading function for the $p^{th}$ clock. EQ. 1B may be evaluated over the independent variable $\omega$(frequency).

Figure 4A:
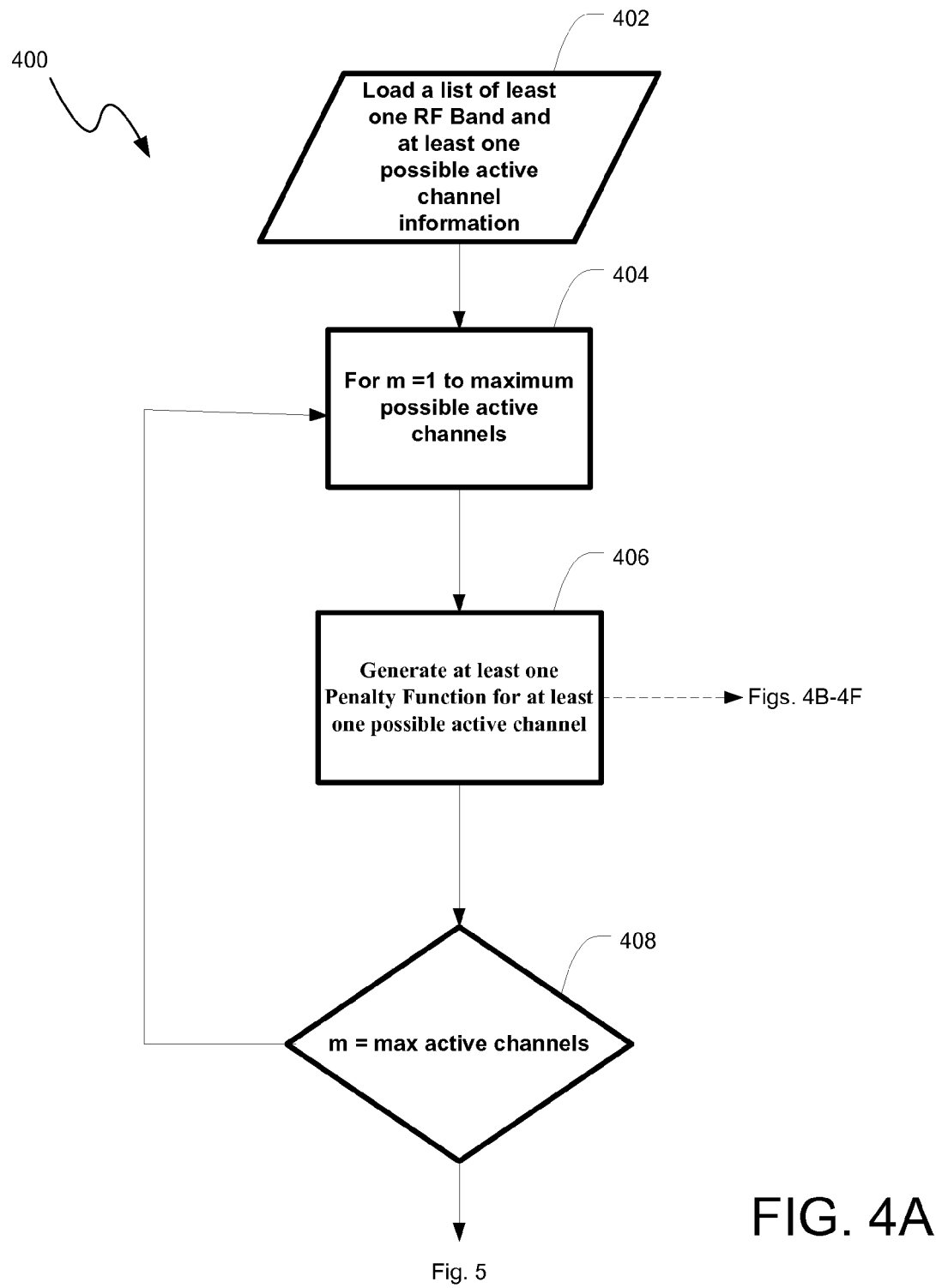
FIG. 4A illustrates a flowchart of exemplary operations to generate a penalty function for at least one active channel in at least one RF band.

In one exemplary embodiment, the frequency range of at least one active channel may be identified in terms of a penalty function for that active channel. For example, FIG. 4A illustrates a flowchart 400 of one exemplary method to generate a penalty function for at least one active channel in at least one RF band. A "penalty function", as used herein, may be defined as a function over the frequency range of an active channel that indicates the frequency-dependent performance impact of noise in that frequency range. The penalty function may be weighted. The penalty function may be defined by, for example, the spectral power mask of a given RF channel. To generate a penalty function, the method of this embodiment may include loading a list of at least one RF band and at least one possible active channel with that RF band 402. Assuming that a plurality of active channels (m) within at least one RF band are identified, the method of this embodiment may be repeated for all such possible active channels, for m=1 to the total number of possible active channels (m) 404. The method of this embodiment may also include generating at least one penalty function for at least one possible active channel 406.

The penalty function for at least one possible active channel may be generated, for example, using Equation 2 below:

$$\left[\sum_{m=1}^{M} \prod_m\left(\frac{\omega_{c,m} - \omega}{\omega_{bw,m}}\right)\right]; \qquad \text{EQ. 2}$$

where $\pi_m$ defines shape of the penalty function for the $m^{th}$ active channel (M is the total number of identified active channels), $\omega_{c,m}$ is the center frequency of the $m^{th}$ active channel, and $\omega_{bw,m}$ is the bandwidth (frequency range) of the $m^{th}$ frequency channel. EQ. 2 may be evaluated over the independent variable $\omega$(frequency).

Figure 4B:
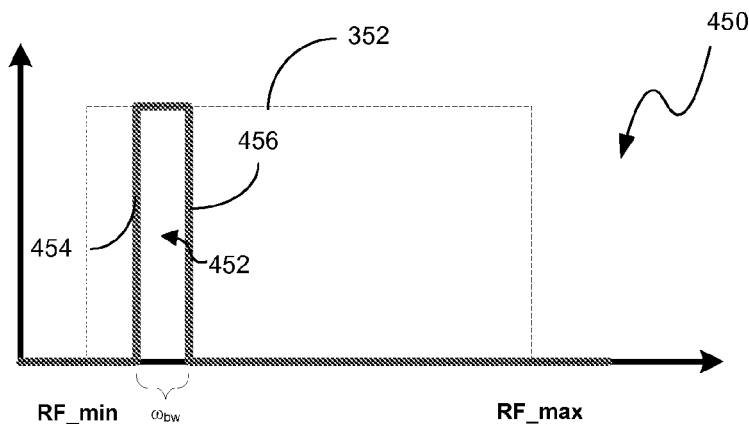
FIGS. 4B-4F depict exemplary penalty functions according to different embodiments consistent with the present disclosure.
Figure 4C:
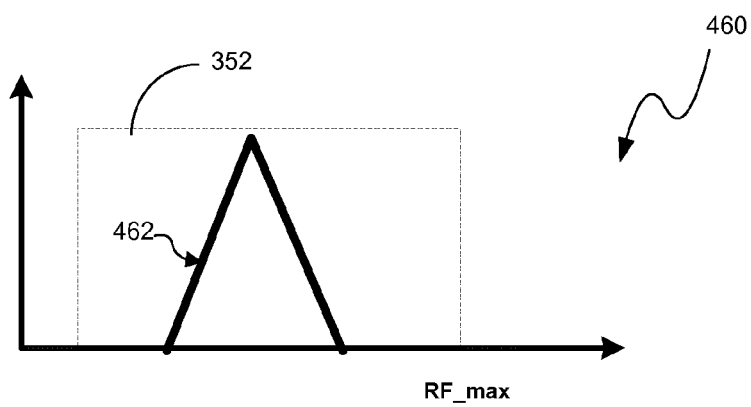

FIGS. 4B-4F depict exemplary penalty functions, represented by respective spectral power masks. The shape of each penalty function in FIGS. 4B-4F may be based on, for example, the modulation technique used by the RF band. Exemplary modulation techniques may include, for example, multi-carrier modulation (MCM), orthogonal frequency division multiplexing (OFDM), coded orthogonal frequency division multiplexing COFDM, constant phase frequency shift key CPFSK, dual multi-tone DMT, and/or other modulation techniques In addition, the shape of each penalty function may be based on, for example, the weighting factor applied to each function. Accordingly, the shape function, $\pi_m$, may change depending on the modulation technique used for a given active channel and/or the weight applied to the spectral content of the active channel. For example, FIG. 4B depicts a graph 450 of one exemplary penalty function 452 within one exemplary RF band 352. The penalty function 452 of this embodiment has a generally rectangular shape, defined in a frequency range between a first frequency 454 and a second frequency 456, having a bandwidth $\omega_{bw}$. The penalty function of this embodiment may be generated using the shape function $\pi_m$. In this example, the shape function $\pi_m$ may define a weighting scheme that weights those frequencies within the identified frequency range of the active channel that are closer to the center frequency of the active channel more heavily than those outside this range. FIG. 4C depicts a graph 460 of another exemplary penalty function 462 within one exemplary RF band 352. The penalty function 462 of this embodiment has a generally triangular shape, and may be generated using a different shape function. In this example, the shape function may define a weighting scheme that weights the center frequency within the identified frequency range of the active channel more heavily than other frequencies.

Figure 4D:
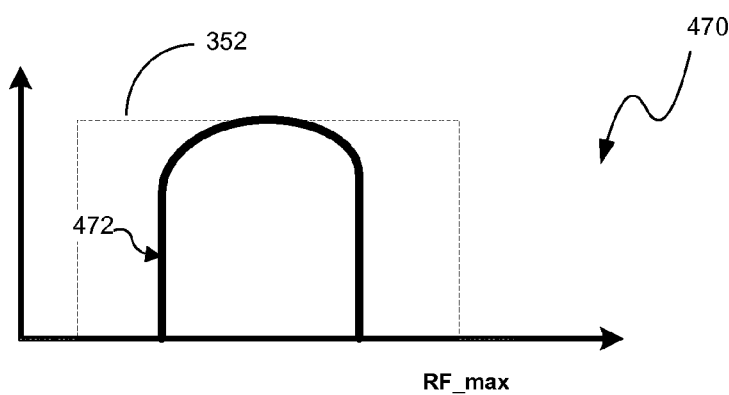
Figure 4E:
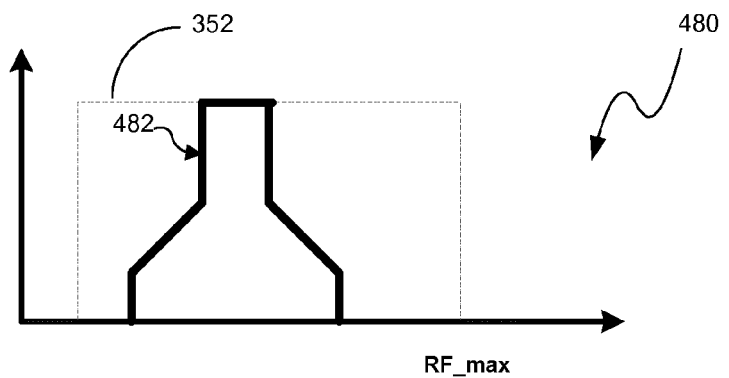

FIG. 4C depicts a graph 470 of another exemplary penalty function 472 within one exemplary RF band 352, and may be generated using yet another shape function. The penalty function 472 of this embodiment has generally rectangular shape with rounded corners. In this example, the shape function may define a weighting scheme that weights those frequencies within the identified frequency range of the active channel that are closer to the center frequency of the active channel more heavily than those outside this range. FIG. 4D depicts a graph 480 of another exemplary penalty function 482 within one exemplary RF band 352, and may be generated using still a different shape function. The penalty function 482 of this embodiment has a generally rectangular shape with a flared base and narrow upper portion. In this example, the shape function may again define a weighting scheme that weights those frequencies within the identified frequency range of the active channel that are closer to the center frequency of the active channel more heavily than those outside this range.

Figure 4F:
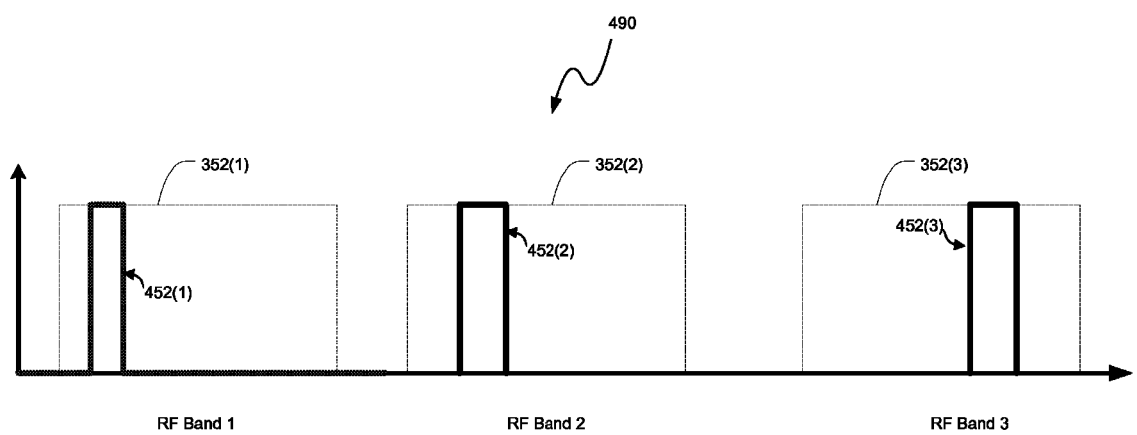

In other embodiments, more than one active channel may be present at the same time. FIG. 4F depicts one exemplary graph 490 of a penalty function that includes three active channels 452(1) in RF Band 1 352(1), 452(2) in RF Band 2 352(2), and 452(3) in RF Band 3 352(3). Of course, the individual shapes of each of the active channels may be different, for example, as shown in FIGS. 4B-4D.

Referring again to the method of FIG. 4A, in a system with a plurality of possible active RF channels, the penalty function for each possible active channel (m) may be generated 408.

Figure 5A:
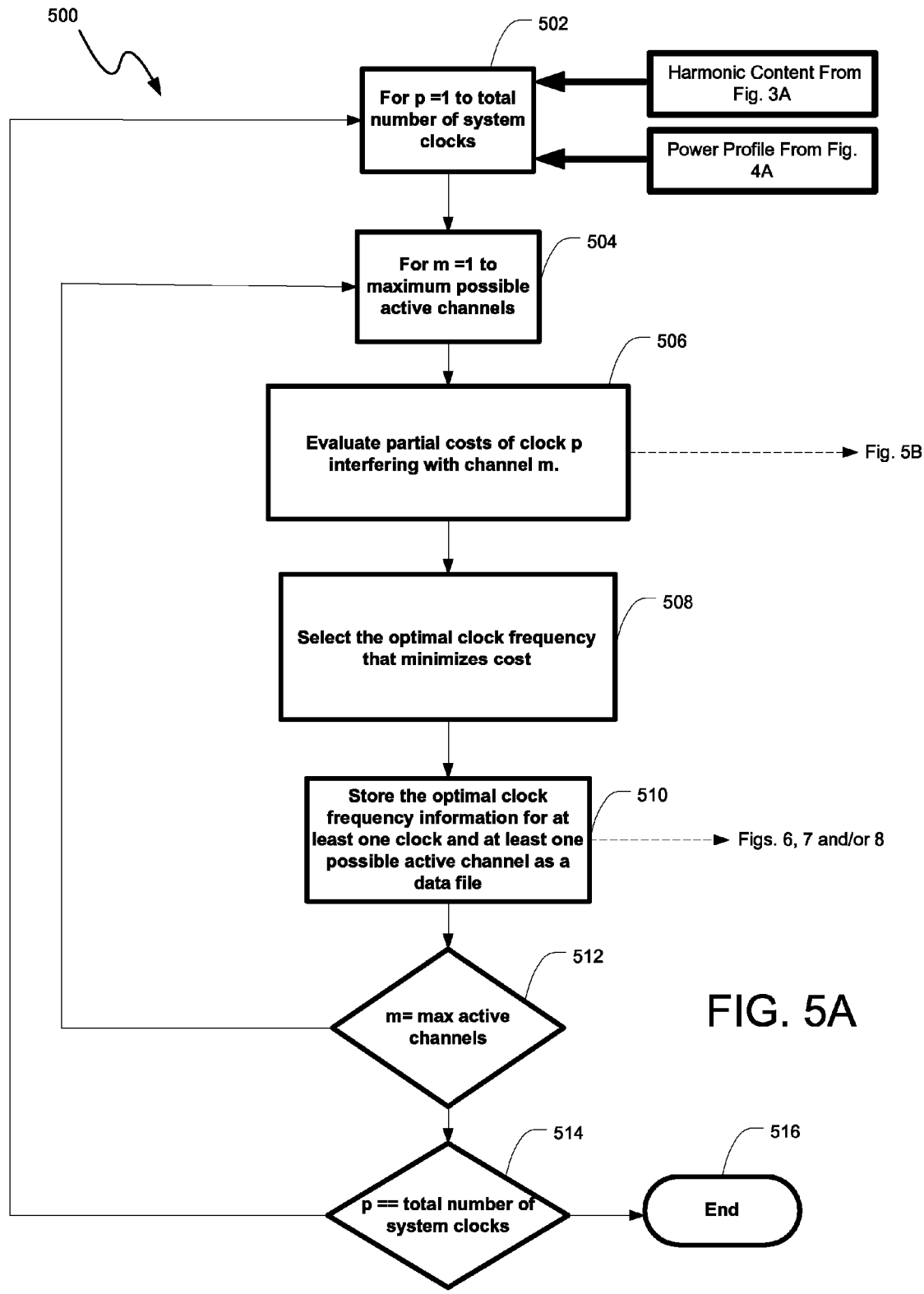
FIG. 5A illustrates a flowchart for selecting the optimal clock frequency that minimizes the total cost according to one embodiment consistent with the present disclosure.

Once the harmonic content of at least one clock is identified, as described above with reference to FIGS. 3A-3B, and a penalty function of at least one possible active channel is identified, as described above with reference to FIGS. 4A-4E, a method according to yet another embodiment may include identifying an overlap, in whole or in part, between the frequency range of the at least one active channel and the frequency range of the at least one clock harmonic and shifting a fundamental frequency of the at least one clock to shift the frequency range of the at least one clock harmonic out of, at least in part, the frequency range of the active channel. To identify an overlap between at least one clock harmonic of at least one clock and at least one active channel, the method of this embodiment may include evaluating a cost function for at least one frequency step of at least one clock with respect to a penalty function of a possible active channel. FIG. 5A illustrates a flowchart 500 for evaluating a cost function. As used herein, a "cost function" may be defined as a function which predicts the amount of impairment of radio performance due to RFI (noise) given one or more clock harmonics overlapping with the frequency ranges of one or more active channels. The value of the cost function, the cost, may be dependent on the number of clock harmonics that overlap, in whole or in part, with the penalty function for a given active channel. Using the harmonic spectrum of a given clock (FIG. 3A) and at least one penalty function of a given RF channel (FIG. 4A), and assuming that a plurality of clocks (p) are identified as being able to be frequency shifted, the method of this embodiment may be repeated for all such clocks, for p=1 to the total number of clocks (p) 504. Assuming that a plurality of active channels (m) within at least one RF band are identified, the method of this embodiment may be repeated for all such possible active channels, for m=1 to the total number of possible active channels (m) 504. The method of this embodiment may also include evaluating a cost function C(w0) for at least one frequency step of at least one clock 506. In one exemplary embodiment, the operation 506 may include evaluating a cost function C(w0) for a plurality of frequency steps to move the clock from Clk_max to Clk_min.

The cost function for at least one clock and at least one possible active channel may be evaluated, for example, using Equation 3A below:

$$C(\omega_0) = \int \sum_{P=1}^{P} \left[ \sum_{n=1}^{Np} A_{p,n} \delta(n\omega_{0,p} - \omega) \right] \left[ \sum_{m=1}^{M} \prod_m \left( \frac{\omega_{c,m} - \omega}{\omega_{bw,m}} \right) \right]; \quad \text{EQ. 3A}$$

where C($\omega_0$) represents the cost of a harmonic residing within the frequency range of the penalty profile. Equation 3A may represent a convolution, over p number of clocks, of EQ. 1A and 2, described above. EQ. 3A may be evaluated over the independent variable $\omega$(frequency).

In other embodiments, where at least one clock is a spread spectrum clock, the cost function for at least one clock and at least one possible active channel may be evaluated, for example, using Equation 3B below:

$$C(\omega_0) = \int \sum_{P=1}^{P} \left[ \sum_{n=1}^{Np} A_{p,n} \Gamma_p \left( \frac{n\omega_{0,p} - \omega}{n\omega_{bw,p}} \right) \right] \left[ \sum_{m=1}^{M} \prod_m \left( \frac{\omega_{c,m} - \omega}{\omega_{bw,m}} \right) \right] d\omega \quad \text{EQ. 3B}$$

EQ. 3B may be evaluated over the independent variable $\omega$(frequency).

Of course, the operations of this embodiment may be iteratively generated over each frequency step and for each clock and each penalty function identified.

Figure 5B:
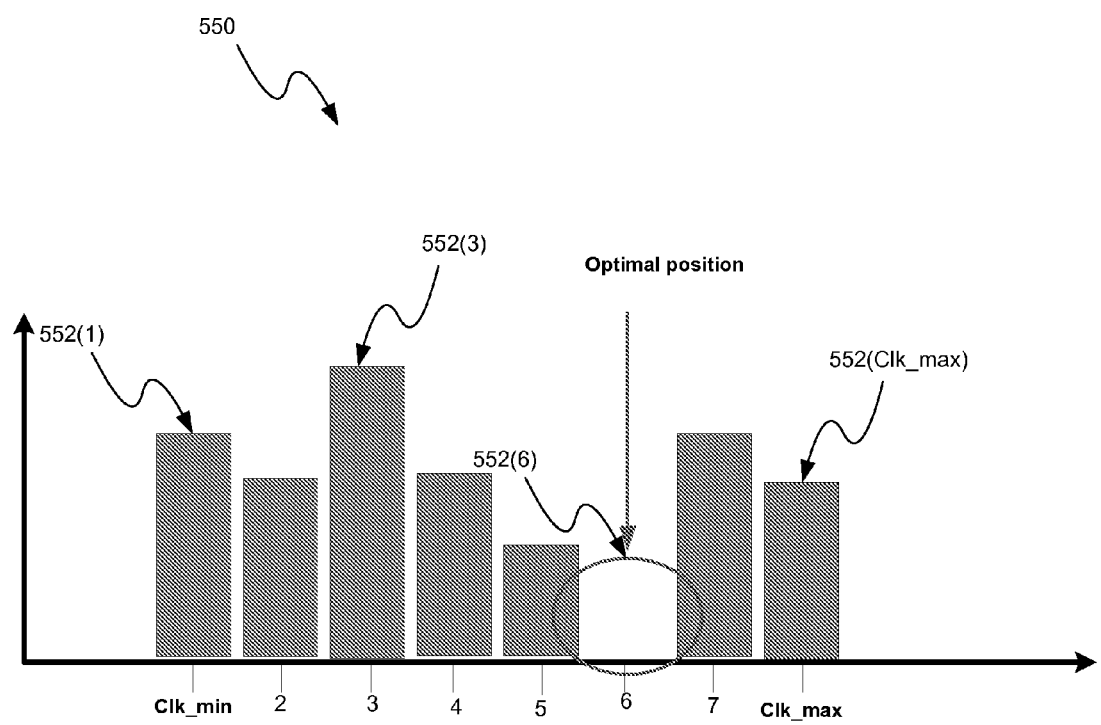
FIG. 5B depicts a graph showing one representative cost function evaluated at several clock frequencies.

FIG. 5B depicts a graph showing one representative cost function evaluated at several clock frequencies to generate a plurality of costs. A plurality of costs 552(1), 552(3), 552(6), . . . , 552(Clk_max) may be generated, one for each frequency step of a clock, e.g., steps from Clk_min, 2, 3, 4, 5, 6, 7, . . . , Clk_max. The value (amplitude) of a given cost may be indicative of at least one harmonic, in whole or in part, within an active channel, i.e., an overlap, in whole or in part, between a given harmonic and an active channel. In this example, cost 552(6) corresponding to clock frequency 6 indicates a cost function having a null value, which may indicate that no harmonics of the given clock reside within the active channel.

Referring again to FIG. 5A, the method of this embodiment may include selecting the optimal clock frequency that minimizes the cost 508. Here an "optimal clock frequency" may be estimated by selecting the lowest cost function value for a frequency nearest to Clk_max. By selecting a clock frequency nearest to Clk_max, the frequency of the clock may be maximized while reducing or eliminating RFI in an active channel. In the example of FIG. 5B, the optimal clock frequency for a given clock may reside at frequency step 6, having a cost 552(6) of zero value. Of course, in other embodiments, the optimal clock frequency may be selected based on the lowest cost function value alone, and/or other system considerations.

The method of this embodiment may further include storing the optimal clock frequency information for at least one clock and at least one possible active channel as a data file 510. Operation 510 may be utilized to create the LUT 110 of FIG. 1. In a system with multiple clocks and multiple possible active RF channels, the method of this embodiment may be repeated for the total number of active channels (m) 512 and the total number of system clocks (p) 514.

FIG. 6 depicts one exemplary LUT 110 according to one embodiment. The LUT 110 of this embodiment may include clock information 602, RF channel information 604 and optimal frequency information 606 organized as a table. For example, in row 608, clock 1 (identified in column 602) may have an optimal frequency of xxx Mhz (identified in column 606) if RF channel 1 is active (identified in column 604). LUT 110 may correlate clock information (602), RF channel information (604) and optimal clock frequency information (606) for all clocks (p) and all possible RF channels (m) in a given system. In operation, and referring again to the system 100 of FIG. 1, active RF channel detection circuitry 106 may be configured to detect an active channel. Clock frequency controller circuitry 108 may be configured to receive the current active channel information (from circuitry 106) and to read LUT 110 to determine the optimal clock frequency for a given clock for a given active channel. Based on the information provided by active RF channel detection circuitry 106 and the LUT 110, clock frequency controller circuitry 108 may be configured to set the clock frequency of one or more clocks 104 to reduce or eliminate RFI in a given active RF channel.

Figure 7:
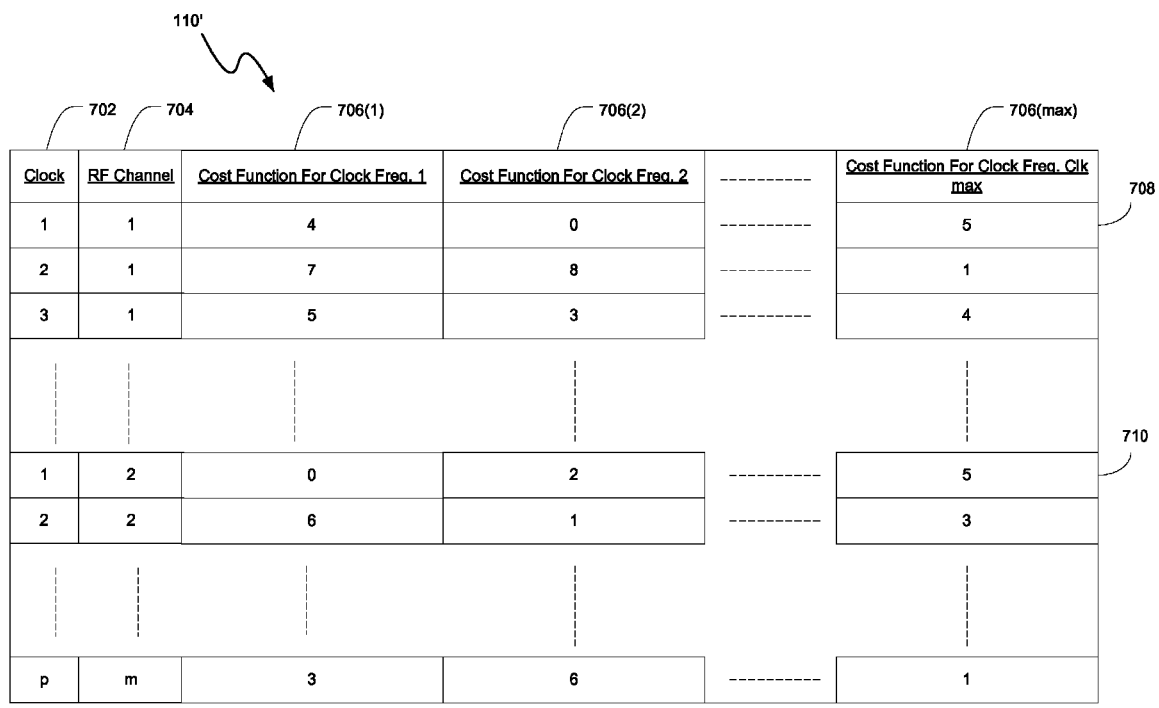
FIG. 7 depicts another exemplary look-up table according to another embodiment.

FIG. 7 depicts another exemplary LUT 110' according to another embodiment. The LUT 110' of this embodiment may include clock information 702, RF channel information 704, and cost function information 706(1), 706(2), . . . , 706(max) for each clock frequency step of a given clock organized as a table. For example, in row 708, clock 1 (identified in column 702) may have a cost function of 4 at a first frequency step (identified in column 706(1)), a cost function of 0 at a second frequency step (identified in column 706(2)) a cost function of 5 at the maximum clock frequency (identified in column 706(max)) if RF channel 1 (identified in column 704) is active. LUT 110' may correlate clock information 702, RF channel information 704 and a plurality of cost functions 706(1), 706(2), . . . , 706(max) for all clocks (p) and all possible RF channels (m) in a given system. In operation, and referring again to the system 100 of FIG. 1, clock frequency controller circuitry 108 may be configured to read LUT 110 and determine, for example, the lowest cost function for a given clock and RF channel. In an embodiment where multiple RF channels are active concurrently, clock frequency controller circuitry may be configured to add (sum) the cost functions from two or more rows of LUT 110' and select, from among the summed cost functions, the lowest (optimal) cost function for a given clock. For example, assuming RF channel 1 and RF channel 2 are active, clock frequency controller circuitry 108 may be configured to add the cost functions of rows 708 and 710 and determine, for example, the lowest cost function when both channel 1 and 2 are active. As described above, the lowest cost function may, in turn, correlate to the optimal operating frequency for a given clock, and thus, clock frequency controller circuitry 108 may select the clock frequency for a given clock that corresponds to the lowest cost function.

Figure 8:
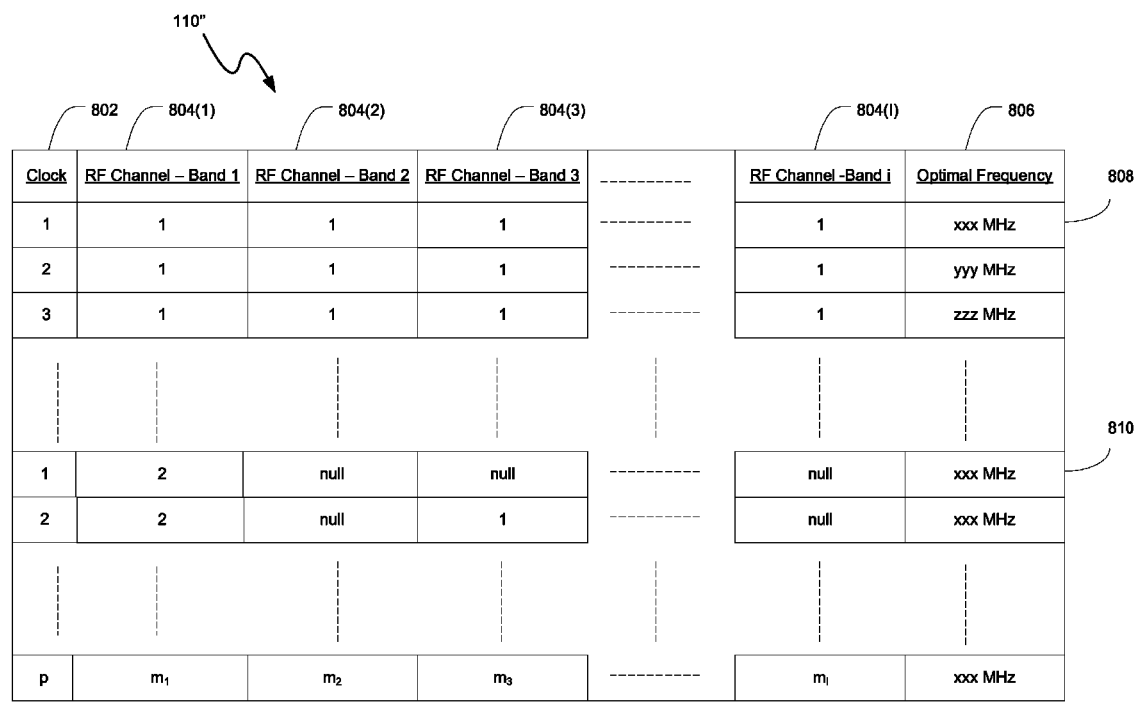
FIG. 8 depicts yet another exemplary look-up table according to another embodiment.

FIG. 8 depicts yet another exemplary LUT 110" according to another embodiment. The LUT 110" of this embodiment may include clock information 802 and RF channel information 804. The LUT 110" of this embodiment may also include RF channel information for each RF frequency band in a system, e.g., RF channel—Band 1 804(1), RF channel—Band 2 804(2), RF channel—Band 3 804(3) through RF Channel—Band I **804(*i*) for a system with i number of possible RF bands. Each RF band may have a defined number of possible active channels, e.g., $m_1$ possible active channels in Band 1, $m_2$ possible active channels in Band 2, $m_3$ possible active channels in Band 3, . . . , $m_i$ possible active channels in Band i. LUT 110" may also include optimal frequency information 806. LUT 110" may correlate clock information 802 (for p number of clocks), RF channel information 804(1), 804(2), 804(3), . . . , 804(*i*) and optimal frequency information 806 in a table. For example, in row 808, clock 1 (identified in column 802) may have an optimal frequency of xxx Mhz (identified in column 806) if RF channel 1—Band 1 (identified in column 804(1)), RF channel 1—Band 2 (identified in column 804(2)), RF channel 1—Band 3 (identified in column 804(3)), and RF channel 1—Band 1 (identified in column 804(1)), RF channel 1—Band i (identified in column 804(*i*)) are all active simultaneously. To generate information relative to a plurality of simultaneous active channels, a penalty function consistent with the embodiment of FIG. 4**F may be used to generate an optimal clock frequency that accounts for more than one active channel.

Of course, the LUT 110" of the embodiment of FIG. 8 may include single active channel information similar to the LUT 110 of FIG. 6. For example, in row 810, clock 1 (identified in column 802) may have an optimal frequency of xxx Mhz (identified in column 806) if RF channel 2—Band 1 is active and all other active channels in the remaining bands are not active (indicated in the LUT 110" as "null"). In operation, and referring again to the system 100 of FIG. 1, active RF channel detection circuitry 106 may be configured to detect one or a plurality of active channels. Clock frequency controller circuitry 108 may be configured to receive the current active channel information (from circuitry 106) and to read LUT 110 to determine the optimal clock frequency for a given clock for a given one or a plurality of active channels. Based on the information provided by active RF channel detection circuitry 106 and the LUT 110, clock frequency controller circuitry 108 may be configured to set the clock frequency of one or more clocks 104 to reduce or eliminate RFI in a given active RF channel, or a given plurality of active RF channels.

Advantageously, the systems, methods and apparatus described herein may offer enhanced RFI mitigation over conventional approaches. Further advantageously, the systems, methods and apparatus described herein may provide a comprehensive RFI-reducing scheme by managing a plurality of system clocks that may cause RFI with one or more active RF channels. Further, the systems, methods and apparatus described herein may take advantage of clock-adjustment without requiring expensive add-on circuitry and/or shielding which may increase the size and/or overall cost of some wireless platforms.

As stated, the at least one wireless network radio receiver 102 may be configured for wireless communication using, for example 802.11a/b/g, Bluetooth, UWB, WiFi, WiMax, and/or other wireless communication protocols. If an 802.11a/b/g wireless communications protocol is used by one or more wireless network receivers 102, it may comply or be compatible with the protocol described in "ANSI/IEEE 802.11, 1999 Edition", as published by LAN MAN Standards Committee of the IEEE Computer Society (Reaffirmed 12 Jun. 2003). If a Bluetooth wireless communications protocol is used by one or more wireless network receivers 102, it may comply or be compatible with the protocol described in the "802.15.1™ IEEE Standard For Information Technology—Telecommunications and Information Exchange Between Systems—Local and Metropolitan Area Networks," Part 15.1, Version 1.1, published Jun. 14, 2005 by the IEEE Computer Society. If a UWB (Ultra Wideband) wireless communications protocol is used by one or more wireless network receivers 102, it may comply or be compatible with the protocol described in "High Rate Ultra Wideband PHY and MAC Standard," $1^{st}$ Edition, December 2005, published by EMCA International. If a WiMax wireless communications protocol is used by one or more wireless network receivers 102, it may comply or be compatible with the protocol described in "IEEE 802.16-2004", published Oct. 1, 2004 by the IEEE WiMax Committee. Of course, the communications protocol used by one or more wireless network receivers 102 may comply with earlier and/or later versions of these standards.

One or more of the components of the system of FIG. 1 may be embodied in one or more integrated circuits (ICs). "Integrated circuit", as used herein, may mean a semiconductor device and/or microelectronic device, such as, for example, a semiconductor integrated circuit chip. "Circuitry", as used in any embodiment herein, may comprise, for example, singly or in any combination, hardwired circuitry, programmable circuitry, state machine circuitry, and/or firmware that stores instructions executed by programmable circuitry. Embodiments of the present disclosure may be implemented in a computer program that may be stored on a storage medium having instructions to program a system (e.g., computer system and/or a machine and/or processor) to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Various features, aspects, and embodiments have been described herein. The features, aspects, and numerous embodiments described herein are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method, comprising:
   identifying the frequency range of at least one active channel of at least one wireless communication RF band;
   identifying the frequency range of at least one clock harmonic;
   identifying an overlap, in whole or in part, between the frequency range of the at least one active channel and the frequency range of the at least one clock harmonic; and
   shifting a fundamental frequency of the at least one clock to shift the frequency range of the at least one clock harmonic out of, at least in part, the frequency range of the at least one active channel.

2. The method of claim 1, wherein said identifying the frequency range of at least one active channel of at least one wireless communication RF band further comprising:
   generating a penalty function that is a function over the frequency range of the at least one active channel, that indicates the frequency-dependent performance impact of the at least one clock harmonic.

3. The method of claim 2, wherein said penalty function comprises a spectral power mask of the at least one active channel.

4. The method of claim 1, wherein said identifying an overlap, in whole or in part, between the frequency range of the one or more active channels and the frequency range of the one or more clock harmonics further comprising:
   evaluating a cost function and generating one or more cost values for each of the at least one clock harmonics and for each of the at least one clock, said cost values representing the amount that at least one clock harmonic impairs at least one active channel.

5. The method of claim 4, further comprising:
   selecting the lowest cost value, said lowest cost value corresponding to the optimal fundamental clock frequency of the at least one clock.

6. The method of claim 4, further comprising:
   generating a look-up table that correlates the identity of the at least one clock, the identity of the at least one active channel, of the at least one wireless communication RF band, and said optimal clock frequency for the at least one clock.

7. An article comprising a machine-readable storage medium containing instructions that if executed enable a system to:
   identify the frequency range of at least one active channel of at least one wireless communication RF band;
   identify the frequency range of at least one clock harmonic;
   identify an overlap, in whole or in part, between the frequency range of the at least one active channel and the frequency range of the at least one clock harmonic; and
   shift a fundamental frequency of the at least one clock to shift the frequency range of the at least one clock harmonic out of, at least in part, the frequency range of the at least one active channel.

8. The article of claim 7, wherein said machine-readable storage medium containing further instructions that if executed enable a system to:
   generating a penalty that is a function over the frequency range of the at least one active channel, that indicates the frequency-dependent performance impact of the at least one clock harmonic.

9. The article of claim 7, wherein said machine-readable storage medium containing further instructions that if executed enable a system to:
   evaluate a cost function and generating one or more cost values for each of the at least one clock harmonics and for each of the at least one clock, said cost values representing the amount that at least one clock harmonic impairs at least one active channel.

10. The article of claim 9, wherein said machine-readable storage medium containing further instructions that if executed enable a system to:
select the lowest cost value, said lowest cost value is the optimal fundamental clock frequency of the at least one clock.

11. The article of claim 10, wherein said penalty function comprises a spectral power mask of the at least one active channel.

12. The article of claim 9, wherein said machine-readable storage medium containing further instructions that if executed enable a system to:
generate a look-up table that correlates the identity of the at least one clock, the identity of the at least one active channel, of the at least one wireless communication RF band, and said optimal clock frequency for the at least one clock.

13. A method, comprising:
identifying at least one active channel of at least one wireless communication RF band;
generating at least one penalty function for the at least one active channel of the at least one wireless communication RF band;
identifying at least one clock harmonic that overlaps, at least in part, with the at least one penalty function; and
shifting said fundamental frequency of said clock to said optimal clock frequency.

14. The method of claim 13, further comprising:
generating a spectrum of clock harmonics for a plurality of clock frequency steps of a clock.

15. The method of claim 13, further comprising:
generating a look-up table that correlates the identity of at least one said clock, the identity of the at least one active channel of the at least one wireless communication RF band, and said optimal clock frequency for the at least one clock.

16. The method of claim 13, wherein said at least one penalty function includes a function over the frequency range of the at least one active channel, that indicates the frequency-dependent performance impact of the at least one clock harmonic.

17. The method of claim 13, wherein said identifying said overlap, in whole or in part, between the frequency range of the at least one active channel and the frequency range of the at least one clock harmonic further comprising:
evaluating a cost function and generating one or more cost values for each of the at least one clock harmonic and for each of the at least one clock, said cost values representing the amount that at least one clock harmonic impairs at least one active channel.

18. The method of claim 13, wherein said at least one penalty function comprises a spectral power mask of the at least one active channel.

19. The method of claim 13, identifying an optimal clock frequency based on, at least in part, the lowest number of clock harmonics that overlap with said at least one penalty function at a given clock frequency step.

20. A wireless platform system, comprising:
at least one wireless network radio receiver configured to receive at least one RF channel of at least one wireless communication RF band;
at least one clock;
a look-up table correlating the identity of at least one said clock, the identity of the at least one active channel of the at least one wireless communication RF band, and an optimal clock frequency for the at least one clock, the optimal clock frequency is based on, at least in part, the amount of overlap of clock harmonics of said at least one clock, weighted by a penalty function, that overlap with at least one active channel; and
clock frequency controller circuitry configured to determine, using the look-up table, the optimal clock frequency based on the at least one RF channel and shift the clock frequency of said clock to said optimal clock frequency.

21. The system of claim 20, wherein said penalty function is a function over the frequency range of the at least one active channel, that indicates the frequency-dependent performance impact of the at least one clock harmonic.

22. The system of claim 20, wherein said penalty function comprises a spectral power mask of the at least one active channel.

23. The system of claim 20, wherein said clock frequency controller circuitry is further configured to evaluate a cost function and generate one or more cost values for each of the at least one clock harmonics and for each of the at least one clock, said cost values representing the amount that at least one clock harmonic impairs at least one active channel.

* * * * *